US008855129B2

(12) United States Patent  
Shahar et al.

(10) Patent No.: US 8,855,129 B2  
(45) Date of Patent: Oct. 7, 2014

(54) HYBRID METHOD AND DEVICE FOR TRANSMITTING PACKETS

(75) Inventors: Boaz Shahar, Ra'anana (IL); Freddy Gabbay, Tel Aviv-Yaffo (IL); Eyal Soha, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 1497 days.

(21) Appl. No.: 11/916,711

(22) PCT Filed: Jun. 7, 2005

(86) PCT No.: PCT/IB2005/051841  
§ 371 (c)(1),  
(2), (4) Date: Apr. 8, 2008

(87) PCT Pub. No.: WO2006/131786  
PCT Pub. Date: Dec. 14, 2006

(65) Prior Publication Data  
US 2008/0198866 A1    Aug. 21, 2008

(51) Int. Cl.  
*H04L 12/28* (2006.01)  
*H04L 12/54* (2013.01)  
*H04L 12/851* (2013.01)  
*H04L 12/863* (2013.01)  
*H04L 12/873* (2013.01)  
*H04L 12/869* (2013.01)

(52) U.S. Cl.  
CPC .......... *H04L 12/5693* (2013.01); *H04L 47/245* (2013.01); *H04L 47/522* (2013.01); *H04L 47/50* (2013.01); *H04L 47/6235* (2013.01); *H04L 47/58* (2013.01)

USPC .......... 370/418; 370/394; 370/412; 370/413; 370/414; 370/417

(58) Field of Classification Search  
None  
See application file for complete search history.

(56) References Cited

U.S. PATENT DOCUMENTS

| | | | |
|---|---|---|---|
| 6,262,986 B1 * | 7/2001 | Oba et al. | 370/399 |
| 6,359,884 B1 * | 3/2002 | Vincent | 370/389 |
| 6,654,376 B1 | 11/2003 | Stacey et al. | |
| 6,775,256 B1 | 8/2004 | Hill et al. | |
| 7,440,405 B2 * | 10/2008 | Hsieh et al. | 370/235 |
| 7,457,297 B2 * | 11/2008 | Woo et al. | 370/395.41 |
| 2003/0219026 A1 | 11/2003 | Sun et al. | |
| 2004/0177087 A1 * | 9/2004 | Wu et al. | 707/102 |

OTHER PUBLICATIONS

Foag et al; "Queuing algorithm for speculative network processors"; Proceedings of the 18th Annual Symposium on High Performance Computing Systems and Applications, May 2004, Canada.

* cited by examiner

*Primary Examiner* — Faruk Hamza  
*Assistant Examiner* — Aixa A. Guadalupe Cruz

(57) ABSTRACT

A method for transmitting packets, the method includes receiving multiple packets at multiple queues. The method is characterized by dynamically defining fixed priority queues and weighted fair queuing queues, and scheduling a transmission of packets in response to a status of the multiple queues and in response to the definition. A device for transmitting packets, the device includes multiple queues adapted to receive multiple packets. The device includes a circuit that is adapted to dynamically define fixed priority queues and weighted fair queuing queues out of the multiple queues and to schedule a transmission of packets in response to a status of the multiple queues and in response to the definition.

21 Claims, 4 Drawing Sheets

HYBRID METHOD AND DEVICE FOR TRANSMITTING PACKETS

FIELD OF THE INVENTION

The present invention relates to a hybrid device and method for transmitting packets, especially Ethernet packets.

BACKGROUND OF THE INVENTION

Modern communication is based upon commonly used communication standards and protocols. In many cases a communication protocol that was designed for a certain purpose is eventually used for other purposes. The Internet Protocol and the Ethernet are good examples of communication protocols that are used for various services that were not supported by these protocols when they first emerged to the market.

Different services or application are characterized by different requirements. For example the transmission of data differs from the transmission of time sensitive traffic such as voice or video.

In order to allow application of different types to be served by one protocol or one protocol suit, various quality of service mechanisms were developed. An article titled "Comparative Qos Technologies" by U4EA technologies, at www.u4eatech.com, describes the following quality of service mechanisms: First In First Out (also known as best effort), Priority Queuing, Custom Queuing, Weighted Fair Queuing (WFQ), Class Based Weighted Fair Queuing (CB-WFQ), Low Latency Queuing (LLQ), Random Early Detection (RED), Weighted Random Early Detection (WRED), TCP Rate Control, Head On the Line (HOL), Partial Buffer Sharing (PBS), Token Bucket and Tail Drop. It is noted that some of these techniques are used for arbitration and some for rate shaping.

The following U.S. patents, all being incorporated herein by reference, provide a brief description of some prior art scheduling schemes: U.S. Pat. No. 6,262,986 of Oba et al., titled "Method and apparatus for packet scheduling using queue length and connection weight and U.S. Pat. No. 6,359,884 of Vinvent, titled "Modular scalable packet scheduler with rate based shaping and virtual port scheduler".

There is a need to provide an efficient method and device for scheduling a transmission of packets.

SUMMARY OF THE PRESENT INVENTION

A hybrid device and method for transmitting packets, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Figure 1:
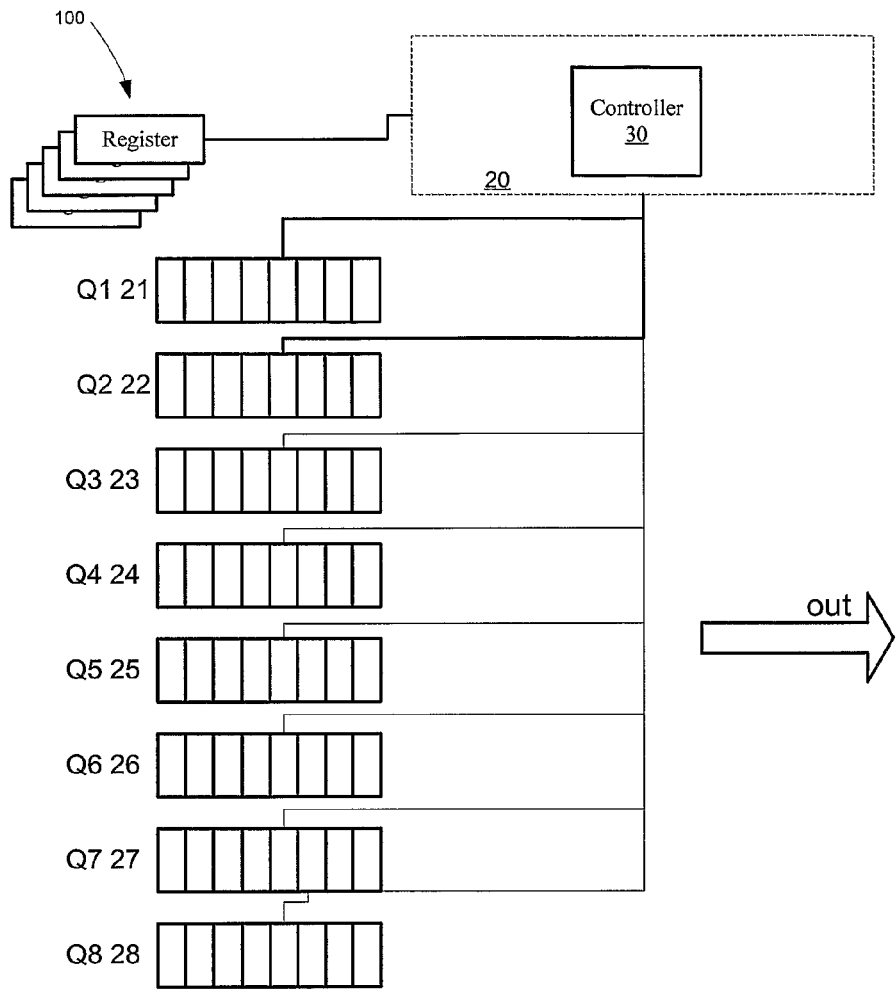
FIG. 1 illustrates a device according to an embodiment of the invention.
Figure 1:
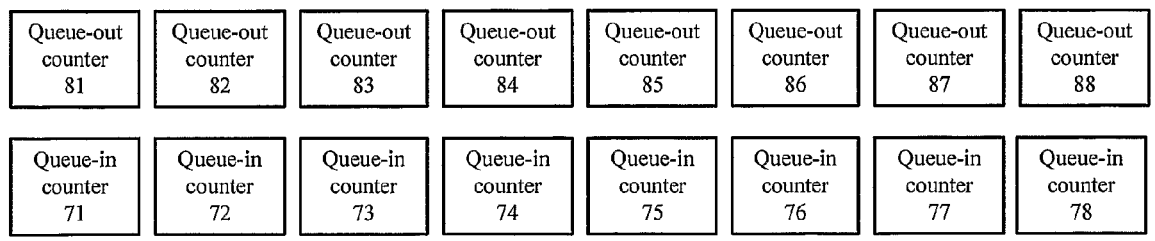

FIG. 1 illustrates a device 10 according to an embodiment of the invention.

Figure 2:
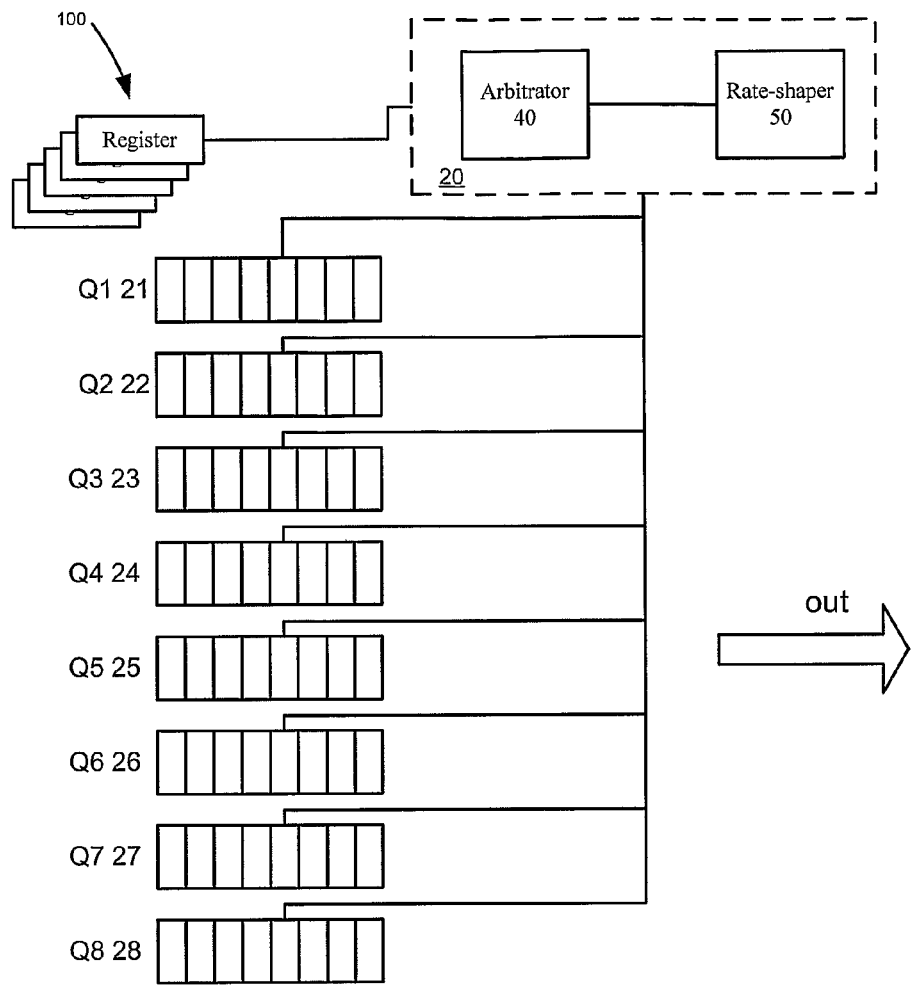
FIG. 2 illustrates a device according to another embodiment of the invention.
Figure 2:
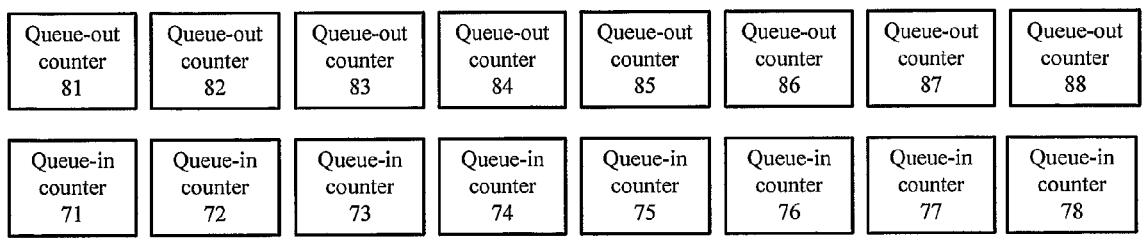

Device 10 includes multiple packet queues, such as eight queues Q1-Q8 21-28, and a circuit 20 that can include a controller 30. The controller 30 is adapted to executed a set of instructions that allow the controller to apply arbitration mechanisms and rate-shaping mechanisms. It is noted that the arbitration as/or the rate shaping can be implemented by dedicated hardware components, and that circuit 20 can include, for example, an arbitrator 40 and a rate-shaper 50, as illustrated in FIG. 2.

The inventor used a communication controller integrated circuit from the PowerQuicc™ family of Freescale™. It is noted that other hardware components as well as software an/or middleware components can be used.

The inventors applied the arbitrating and rate shaping policies on a 1 Ghz Ethernet link, but the invention can be applied on other packets as well as links that differ from a 1 Ghz link.

Device 10 includes a set of registers that are collectively denoted 100, as well as two sets of counters, such as queue-in counters 71-78, and queue-out counters 81-88. Each queue out of Q1-Q8 21-28 is associated with a pair of counters, one (queue-in counter) for counting the number of packets that enter the queue and another (queue-out counter) for counting the number of packets that are read from the queue. The difference between the values of these two counters provides an indication about the number of packets in the queue. By using a pair of counters the inventors avoided timing problems resulting from possible simultaneous access to a counter resulting from simultaneous read and write operation to and from a certain queue.

The device 10 facilitates dynamic definition of a queue as a fixed priority queue or as a weighted fair queuing (WFQ) queue. Conveniently the controller 30 can alter, in response to requests from a user, a mask that defined which queues are WFQ queues and which are fixed priority (FP) queues.

Conveniently, two different but WFQ mask and FP mask can be used. These masks can be complementary.

According to an embodiment of the invention at least one of the FP mask and the WFQ mask has a corresponding shadow mask. The user can write, even during the execution of the arbitrating and/or rate shaping session, to the mask (or to the shadow mask) while the arbitrating and/or rate shaping session utilizes the shadow mask (or the mask). The update is taken into account in predefined periods, such as when a rate shaping session ended, queues were emptied, when a packet was transmitted, and the like.

Conveniently the FP queues have a higher priority then the WFQ queues, but this is not necessarily so. The FP queues can differ by priority from each other. One FP queue can have a higher priority than another FP queue.

The rate shaper times the transmission of a selected packet in response to various rate shaping constraints or parameters such as but not limited to average aggregate bandwidth, peak aggregate bandwidth, maximal packet length, and the like. Conveniently, the rate shaper is also responsive to bandwidth characteristics of one or more queue (for example—if the queue is a bypass and/or a NAAB queue).

Conveniently, a first bandwidth characteristic is referred to as a bypass characteristic. A queue can be defined as a bypass queue and in this case once this queue is selected by the arbitration session, the first (or more) packet of this queue is transmitted substantially instantaneously, regardless of rate shaping limitations.

Conveniently, a second bandwidth characteristic is referred to as a non-affecting aggregate bandwidth (NAAB) characteristic. A queue can be defined as a NAAB queue and in this case once this queue is selected by the arbitration session, the first (or more) packets from this queue is transmitted, but the bandwidth consumed by this transmission is not taken into account.

Conveniently, each queue can be defined as a bypass queue and/or as a NAAB queue.

Figure 3:
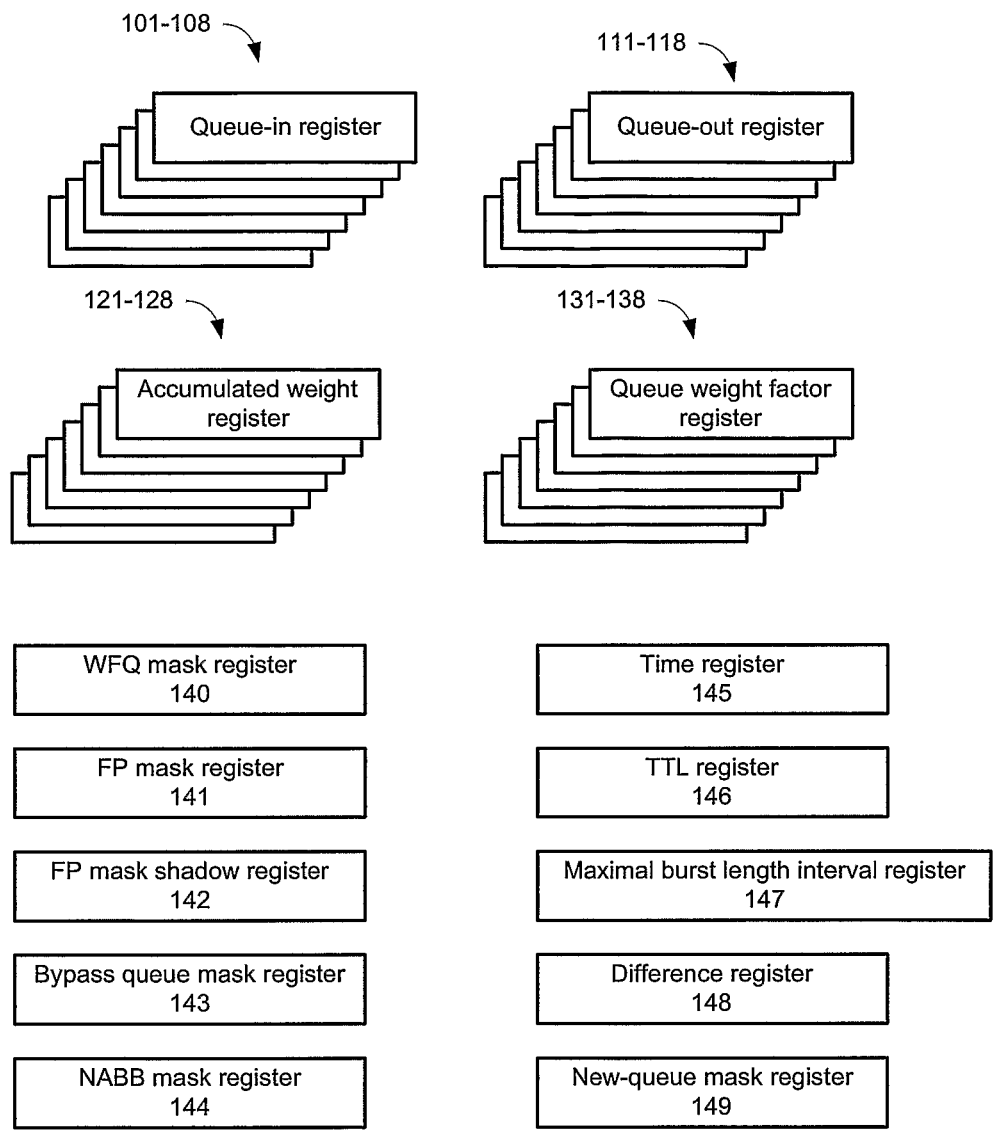
FIG. 3 illustrates multiple registers according to an embodiment of the invention.

FIG. 3 illustrates registers 100 according to an embodiment of the invention.

Registers 100 include eight queue-in registers 101-108, eight queue-out registers 111-118, eights accumulated weight registers 121-128, eight weight factor registers 131-138, WFQ mask register 140, FP mask register 141, FP mask shadow register 142, bypass queue mask register 143, NAAB mask register 144, time register 145, TTL register 146, maximal-burst-length-interval register 147, Difference register 148, and new-queue mask register 149.

The queue-in registers 101-108 are connected to queue-in counters 71-78, and are capable of sampling the values of these counters. The eight queue-out registers 111-118, connected to queue-out counters 81-88, and are capable of sampling the values of these counters.

The eights accumulated weight registers 121-128 includes the accumulated weight factor that reflects the history of transmissions from a certain queue. This accumulated weight affects the WFQ arbitration.

The eight weight factor registers 131-138 store a weight factor that represents a ratio between a length (or period) of a packet transmitted from a certain queue and between the weight that will be associated to this transmission.

The WFQ mask register 140 defines which queues out of Q1-Q8 are WFQ queues. The FP mask register 141 defines which queues out of Q1-Q8 are FP queues. The FP mask shadow register 142 can be written during the execution of a rate shaping and/or arbitration scheme. During an update stage the content of the FP mask shadow register is written to the FP mask register 141.

The bypass queue mask register 143 defines which queues out of Q1-Q8 are bypass queues. The NAAB mask register 144 defines which queues out of Q1-Q8 are NAAB queues. The new-queue mask register 149 defines which queues out of Q1-Q8 received any packet during the last (or during the last K) iterations of the arbitration session.

The time register 145, TTL register 146, maximal-burst-length-interval register 147, and Difference register 148 store various variables that are required to the rate-shaping process.

Figure 4:
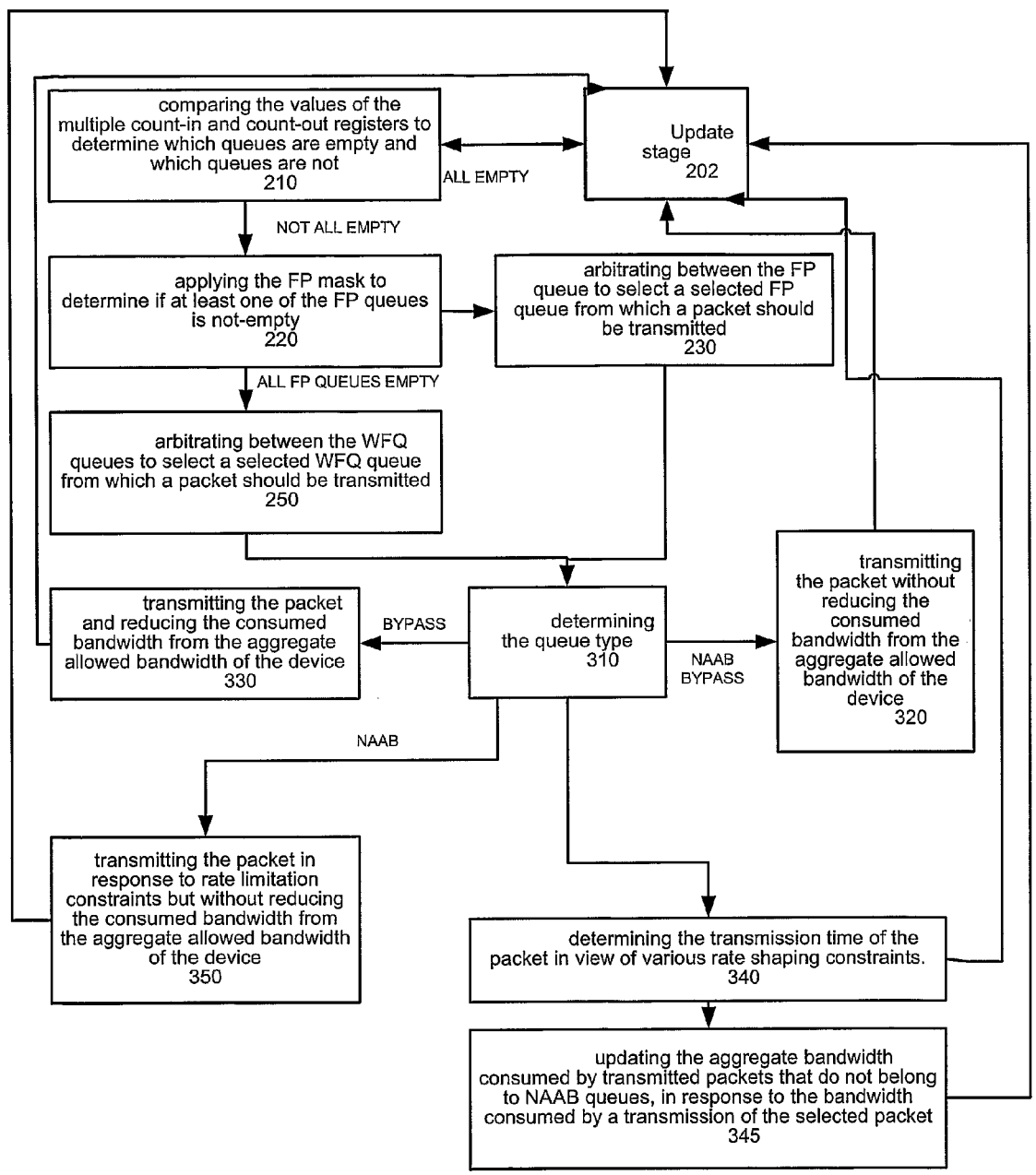
FIG. 4 illustrates a method for transmitting packets, according to an embodiment of the invention.

FIG. 4 illustrates a method 200 for scheduling a transmission of a packet according to an embodiment of the invention.

Method 200 starts by stage 202 of updating various parameters. During the updating stage 202 various parameters, including user provided parameters as well as parameters that reflect pervious iterations of method 200 can be received, updated or calculated. For example, an FP mask can be updated with a value of a shadow FP mask that was provided during iterations of stages 210-360. Thus, if a user has written to the FP shadow mask during the execution of various stages of method 200, the FP mask is updated. Stage 202 is followed by stage 210.

Stage 210 includes comparing the values of the multiple queue-in and queue-out registers to determine which queues are empty and which queues are not. If all queues were empty stage 210 jumps to stage 202.

If at least one queue is not empty, stage 210 is followed by stage 220 of applying the FP mask to determine if at least one of the FP queues is not-empty.

If one or more FP mask is not empty stage 220 is followed by stage 230 of arbitrating between the FP queues to select a selected FP queue from which a packet should be transmitted.

The arbitration between FP queues can involve any prior art arbitration scheme. For example, the inventors used a priority based arbitration scheme in which the number of the queue determines its priority. The first FP queue has the highest priority. Stage 230 is followed by sequence of stages (310-360) that determine the timing of the transmission of the selected packet.

If all FP queues were empty then stage 220 is followed by stage 250 of arbitrating between the WFQ queues to select a selected WFQ queue from which a packet should be transmitted. The arbitration between WFQ queues can involve any prior art arbitration scheme.

According to an embodiment of the invention the arbitration between the WFQ is responsive to two parameters: the weight of each queue and whether the queue is a new one.

The weight of a queue (also referred to as aggregate weight) is responsive to pervious transmission from that queue and to a weight factor. If method 200 applies an arbitration scheme that selects the queue having the lowest weight then lower weight factors are associated with higher priority queues. The weight factor of each queue and an initial aggregate weight can be initialized by the user, but this is not necessarily so.

Conveniently, there is a distinction between new queue (queues that just recently received a packet) and between a queue that received a packet in previous iterations of the WFQ arbitration stage. Thus, stage 250 can start by arbitrating between "old" WFQ queues. If only new WFQ are not empty then stage 250 can arbitrate between them.

Stage 250 is followed by stage 310.

According to an embodiment stages 210-250 run at least partially in parallel to stages 310-360. In other words certain packets can be selected by stages 210-250 while other packets are scheduled for transmission.

A queue or a virtual queue can be implemented for saving the packets that were selected by stages 210-250, before these packets are scheduled to be transmitted (and even before being transmitted) by stages 310-360.

Stage 310 includes determining the queue type.

If the queue is a bypass queue and also a NAAB type then stage 310 is followed by stage 320 of transmitting the packet regardless of rate shaping constraints and without reducing the consumed bandwidth from the aggregate allowed bandwidth of the device 10.

If the queue is a bypass queue and not a NAAB queue then stage 310 is followed by stage 330 of transmitting the packet and reducing the consumed bandwidth from the aggregate allowed bandwidth of the device 10.

If the queue is not a bypass queue and not a NAAB queue than stage 310 is followed by stage 340 of determining the transmission time of the packet in view of various rate shaping constraints. These rate shaping constraints can include allowed aggregate bandwidth, utilized aggregate bandwidth, peak rate and the like.

According to an embodiment of the invention stage 340 schedules the transmission of a packet by comparing between a Time value that reflects the time that passes during the execution of method 200 and between a TTL. The TTL value represent the time in which a next packet can be transmitted. TTL is responsive to the aggregate bandwidth and is updated by the packet transmission history. When TTL is calculated bypass traffic is conveniently not taken into account.

Accordingly, the transmission is also responsive to the difference (Diff) between Time, TTL and a period (MBLinterval) that is required for the transmission of the longest allowed burst. If the difference is greater than that period (MBLinterval) then the Time is updated such as to reduce the difference between it and TTL. This correction is required in cases that the device 10 was not able to transmit for a relatively long period. This idle period can result from various reasons including device 10 failure, line failures, and a receiver failures. Without this correction the gap between TTL and Time can remain very high for very long periods, thus resulting in a long sequence of high rate transmissions. This is not desirable for various reasons including the inability of a receiver to receive this sequence.

Stage 340 is followed by stage 345 of updating the aggregate bandwidth consumed by transmitted packets that do not belong to NAAB queues, in response to the bandwidth consumed by a transmission of the selected packet. Stage 345 is followed by stage 202.

If the queue is a bypass queue but a NAAB queue then stage 310 is followed by stage 350 of transmitting the packet in response to rate limitation constraints but without reducing the consumed bandwidth from the aggregate allowed bandwidth of the device 10. Stage 350 is followed by stage 202.

It is noted that bypass packets are transmitted regardless of rate shaping (or rate limiting) constraints. It is noted that this is not necessarily so and in any case the amount of transmitted packets is limited by transmission limitations such as the link's bandwidth, receiver capacity and the like.

According to various embodiments of the invention the mentioned above method (200) can be executed by a device, such as device 10, controller 30 or a processor that executes a set of instructions that is stored within a computer readable medium. This medium is not necessarily an internal memory unit, and it can include magnetic storage devices (such as magnetic tape, diskettes, disk drives), optical storage devices (such as DVD, CD) and the like. The controller 30 can execute the method in cooperation with other components such as storage unit, buses and the like.

Conveniently, a computer readable medium is provided, having stored thereon a set of instructions. The set of instructions, when executed by a media access controller, cause the controller to receive indication about multiple packets received at multiple queues; dynamically define fixed priority queues and weighted fair queuing (WFQ) queues; and schedule a transmission of packets in response to a status of the multiple queues and in response to the definition.

Conveniently, the set of instructions also cause the controller to program a mask. Conveniently, the set of instructions also cause the controller to monitor a status of at least one queue by a comparing between a queue write counter and between a queue read counter.

Conveniently, the set of instructions also cause the controller to schedule a transmission of a packet in response to rate limiting parameters.

Conveniently, the set of instructions also cause the controller to define at least one queue as a bypass queue, wherein the device schedules a transmission of packets of the bypass queue regardless of rate limiting parameters.

Conveniently, the set of instructions also cause the controller to schedule a transmission of packets in response to an aggregate bandwidth.

Conveniently, the set of instructions also cause the controller to determine a bandwidth allocated for a transmission of packets from at least one non-bypass queue in response to the aggregate bandwidth and to bandwidth required for a transmission of packets from at least one bypass queue.

Conveniently, the set of instructions also cause the controller to allocate a bandwidth allocated for a transmission of packets from at least one non-bypass queue in response to the aggregate bandwidth and ignores bandwidth required for a transmission of packets from at least one bypass queue.

Conveniently, the set of instructions also cause the controller to schedule a transmission of a packet of a WFQ queue in response to a WFQ queue weight, to a packet wait in WFQ queue period and to bandwidth consumed by packets from that WFQ queue.

Conveniently, the set of instructions also cause the controller to define at least one queue as a non-affecting aggregate bandwidth queue.

Conveniently, the set of instructions also cause the controller to
adjust a time variable in response to a longest packet transmission interval and a time parameter that is responsive to an allowed aggregate bandwidth.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for transmitting packets, the method comprises:
   receiving multiple packets at multiple queues;
   defining a first queue of the multiple queues as a fixed priority queue and a second queue of the multiple queues as a weighted fair queuing (WFQ) queue, wherein the defining comprises programming a mask register and a shadow mask register;
   scheduling a first transmission of a first set of packets of the multiple packets in response to a status of the multiple queues based upon the mask register and in response to the defining;
   redefining the first queue as a WFQ queue or the second queue as a fixed priority queue based upon the shadow mask register; and
   scheduling a second transmission of a second set of packets of the multiple packets in response to the redefining.

2. The method according to claim 1, wherein the method comprises monitoring a status of at least one queue by a comparing between a queue write counter and between a queue read counter.

3. The method according to claim 1, wherein scheduling the first transmission is further responsive to rate limiting parameters.

4. The method according to claim 3 further comprising defining at least one queue as a bypass queue, wherein a scheduling of packets of the bypass queue ignores the rate limiting parameters.

5. The method according to claim 1, wherein scheduling the first transmission is responsive to an aggregate bandwidth.

6. The method according to claim 5 wherein a bandwidth allocated for a transmission of packets from at least one non-bypass queue is responsive to the aggregate bandwidth and to bandwidth required for a transmission of packets from at least one bypass queue.

7. The method according to claim 5 wherein a bandwidth allocated for a transmission of packets from at least one non-bypass queue is responsive to the aggregate bandwidth and ignores bandwidth required for a transmission of packets from at least one bypass queue.

8. The method according to claim 1, wherein a scheduling of a packet of a WFQ queue is responsive to a WFQ queue weight, to a waiting period of a packet in a WFQ queue and to bandwidth consumed by packets from that WFQ queue.

9. The method according to claim 1, further comprising defining at least one queue as a non-affecting aggregate bandwidth queue.

10. The method according to claim 1, further comprising adjusting a time variable in response to a longest packet transmission interval, and a time parameter that is responsive to an allowed aggregate bandwidth.

11. A device for transmitting packets, the device comprises:
multiple queues adapted to receive multiple packets;
a circuit that is adapted to: dynamically
define a first queue of the multiple queues as a fixed priority queue and a second queue of the multiple queues as a weighted fair queuing (WFQ) queue;
schedule a first transmission of a first set of packets of the multiple packets in response to a status of the multiple queues and in response to the definition;
redefine the first queue as a WFQ queue or the second queue as a fixed priority queue; and
schedule a second transmission of a second set of packets of the multiple packets in response to the redefinition; and
a programmable component adapted to store a mask register and a shadow mask register that define the WFQ queues.

12. The device according to claim 11, wherein the device comprises multiple queue-in counters and multiple queue-out counters.

13. The device according to claim 11, wherein the device is responsive to rate limiting parameters.

14. The device according to claim 13 further adapted to define at least one queue as a bypass queue, wherein the device schedules a transmission of packets of the bypass queue regardless of rate limiting parameters.

15. The device according to claim 11, wherein the device schedules a transmission of packets in response to an aggregate bandwidth.

16. The device according to claim 15 wherein a bandwidth allocated for a transmission of packets from at least one non-bypass queue is responsive to the aggregate bandwidth and to bandwidth required for a transmission of packets from at least one bypass queue.

17. The device according to claim 15 wherein a bandwidth allocated for a transmission of packets from at least one non-bypass queue is responsive to the aggregate bandwidth and ignores bandwidth required for a transmission of packets from at least one bypass queue.

18. The device according to claim 11, wherein the device schedules a transmission of a packet of a WFQ queue in response to a WFQ queue weight, to a packet wait in WFQ queue period and to bandwidth consumed by packets from that WFQ queue.

19. The device according to claim 11, further adapted to define at least one queue as a non-affecting aggregate bandwidth queue.

20. The device according to claim 11, further adapted to adjust a time variable in response to a longest packet transmission interval and a time parameter that is responsive to an allowed aggregate bandwidth.

21. A non-transitory computer readable medium having stored thereon a set of instructions, the set of instructions, when executed by a controller, cause the controller to:
receive indication about multiple packets received at multiple queues;
define a first queue of the multiple queues as a fixed priority queue and a second queue of the multiple queues as a weighted fair queuing (WFQ) queue;
schedule a first transmission of a first set of packets of the multiple packets in response to a status of the multiple queues and in response to the definition;
redefine the first queue as a WFQ queue or the second queue as a fixed priority queue;
schedule a second transmission of a second set of packets of the multiple packets in response to the redefinition; and
a WFQ mask register for defining which queues are WFQ queues; a fixed priority (FP) mask register for defining which queues are fixed priority queues, and a shadow mask register.

\* \* \* \* \*